United States Patent
Goseberg

[11] Patent Number: 5,844,793
[45] Date of Patent: Dec. 1, 1998

[54] HIGH-VOLTAGE TRANSFORMER FOR A TELEVISON RECEIVER INCLUDING SEPARATED PARTIAL WINDINGS TUNED TO DIFFERENT HARMONICS

[75] Inventor: Walter Goseberg, Hanover, Germany

[73] Assignee: Deutsche Thomson Brandt GmbH, Villingen Schwenningen, Germany

[21] Appl. No.: 613,422

[22] Filed: Mar. 11, 1996

[30] Foreign Application Priority Data

Mar. 27, 1995 [DE] Germany ............. 195 10 678.4

[51] Int. Cl.$^6$ ............. H02M 7/10; H02M 3/32; H01J 29/70
[52] U.S. Cl. ............. 363/126; 363/20; 315/411
[58] Field of Search ............. 363/20, 21, 126; 315/410, 411

[56] References Cited

U.S. PATENT DOCUMENTS

| | | | |
|---|---|---|---|
| 3,562,623 | 2/1971 | Farnsworth | 363/20 |
| 3,657,632 | 4/1972 | Miyoshi | 363/41 |
| 3,813,574 | 5/1974 | Sato | 361/146 |
| 3,886,434 | 5/1975 | Schreiner | 363/68 |
| 3,904,928 | 9/1975 | Sawada et al. | 315/410 |
| 3,936,719 | 2/1976 | Miyoshi et al. | 363/126 |
| 3,947,749 | 3/1976 | Kimura et al. | 363/126 |
| 4,406,978 | 9/1983 | Goseberg et al. | 315/411 |
| 4,454,572 | 6/1984 | Godawski | 363/68 |
| 5,523,735 | 6/1996 | Goseberg et al. | 336/208 |
| 5,576,681 | 11/1996 | Sander et al. | 336/208 |

FOREIGN PATENT DOCUMENTS

| | | | |
|---|---|---|---|
| 0082966 | 7/1983 | European Pat. Off. | H04N 5/657 |
| 25 04 355 | 8/1975 | Germany | |

OTHER PUBLICATIONS

Copy of EPO search report in corresponding case citing the above–identified references.

Primary Examiner—Peter S. Wong
Assistant Examiner—Bao Q. Vu
Attorney, Agent, or Firm—Joseph S. Tripoli; Frederick A. Wein

[57] ABSTRACT

A high-voltage transformer for a television receiver is known to be tuned to a specific harmonic of the frequency of the flyback oscillation in order to reduce the internal resistance of the high-voltage source. In certain cases such as, for example, a channel change, a particularly high beam current of the order of magnitude of 3 to 5 mA briefly occurs. As a result of such a current surge, overshoots are produced at the transformer which may increase the flyback voltage at the switching transistor by approximately 150 V and thus endanger the transistor. The object is to design the transformer in such a way that overshoots of this type are reduced. According to the invention, the number of partial windings (W2–W5) is greater than the number of diodes (3–5), and separate partial windings (W2–W5) are tuned to different harmonics. This tuning causes the quality factor to be reduced and the attenuation and the bandwidth to be increased in the system. As a result, the flyback pulse at the high-voltage winding becomes larger and wider and the internal resistance of the high-voltage source is reduced. In addition, interfering overshoots of this pulse, which bring about an increase in the amplitude of the flyback pulse at the primary winding, are significantly reduced. In particular, high-voltage transformer for a television receiver having an increased high voltage.

6 Claims, 2 Drawing Sheets

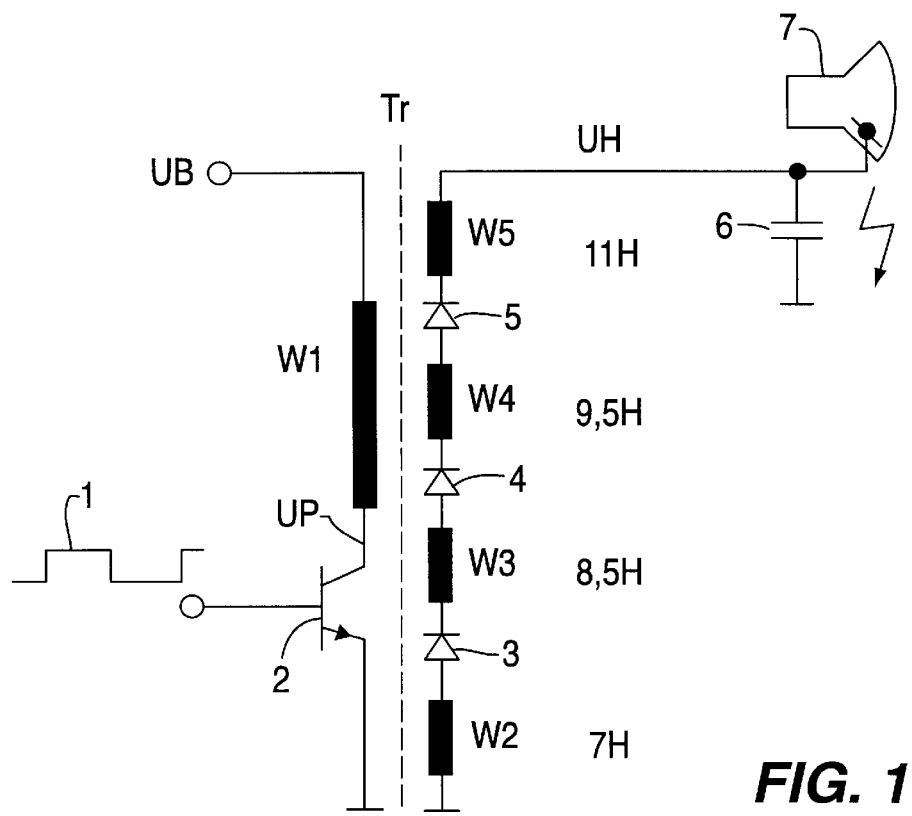
FIG. 1
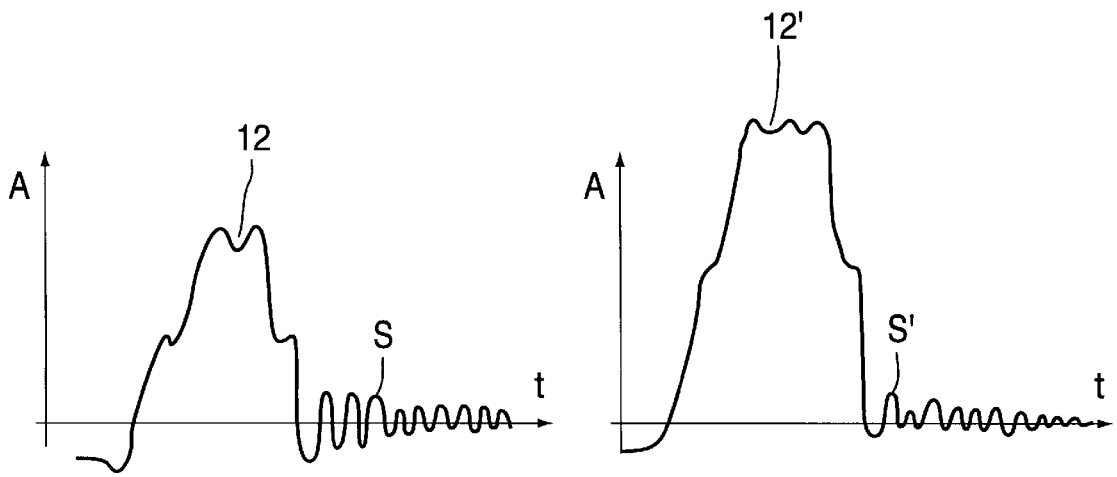
FIG. 2
PRIOR ART
FIG. 3

HIGH-VOLTAGE TRANSFORMER FOR A TELEVISON RECEIVER INCLUDING SEPARATED PARTIAL WINDINGS TUNED TO DIFFERENT HARMONICS

BACKGROUND OF THE INVENTION

1. Field of the Invention

The invention is based on a high-voltage transformer according to the preamble of claim 1.

2. Description of the Prior Art

In the case of a high-voltage transformer of this type, the charging capacitor for the high voltage is recharged only during the relatively narrow peak of the flyback pulse at the high-voltage winding. This narrow pulse peak results in a relatively large internal resistance for the high-voltage source. In order to reduce the internal resistance, it is known to tune the stray inductance of the high-voltage winding together with the effective capacitances to specific harmonics of the frequency of the sinusoidal half-cycle during the flyback time, in particular to an odd harmonic such as, for example, the 5th, the 9th or the 13th harmonic. This tuning achieves a widening of the pulse peak of the flyback pulse, a longer charging time for the charging capacitor and, as a result, a smaller internal resistance of the high-voltage source.

However, in the case of this tuning to a specific harmonic of the flyback oscillation, an appreciable deterioration in the internal resistance is in fact produced as a result of deviations from the correct tuning (5th, 9th, 13th, 17th, etc.). Deviations of this type are caused by unavoidable tolerances in the winding, in the wire diameter, in the value of the flyback capacitor and the flyback time.

In the case of extreme transitions between two different states, for example in the case of a channel change, the system which is tuned to a frequency is suddenly caused to oscillate. In such cases, the picture is unblanked, undiscernibly for the viewer, for a few ms such that a beam current of the order of magnitude of 3 to 5 mA flows. The generally provided control and limiting of the beam current do not begin in this case, because this control loop must have a time constant of approximately 10 to 15 ms in order that genuine white areas in the picture are not corrupted. Given such a high beam current, the disconnection of the high-voltage rectifiers in the high-voltage winding generally produces an extremely high overshoot. The flyback pulse peak at the primary winding at the switching transistor can rise here by more than 150 V. The switching transistor may be endangered by the addition of this voltage increase to the flyback pulse (greater than 1000 Vpp), which is already high in any case, at the transistor. Therefore, it is known to connect a so-called RLC resonant circuit in series with the primary winding of the transformer in order to suppress interfering overshoots of this type. The resonant circuit comprises a coil which is situated in the current path and is connected in parallel with the series circuit formed by a capacitor and a resistor.

The invention is based on the object of designing the transformer in such a way that the amplitude of the overshoots in the high-voltage winding is appreciably reduced.

SUMMARY OF THE INVENTION

This object is achieved by means of the invention specified in claim 1. According to the invention, the number of partial windings of the high-voltage winding is greater than the number of diodes, and separate partial windings are tuned to different harmonics.

The invention thus departs from the prior art, in which tuning was performed to the greatest extent only to one harmonic. By tuning partial windings to different harmonics, the bandwidth of the resonant system is increased in the sense of a bandpass filter characteristic and thus the attenuation is also increased and the quality factor is reduced. Given such an increased bandwidth, the required tuning accuracy is significantly reduced.

This solution yields a plurality of advantages. The tuning to different harmonics changes the waveform of the flyback pulse at the high-voltage winding in such a way that the pulse at the primary winding and consequently at the switching transistor remains to the greatest extent free of interfering and dangerous voltage increases. The danger represented by such voltage increases to the switching transistor is as a result significantly reduced. A reduction in the internal resistance of the high-voltage source is additionally achieved by the waveform of the flyback pulse at the high-voltage winding that has been attained. Moreover, the internal resistance is to the greatest extent independent of tolerances. The abovementioned LRC circuit provided hitherto in the primary path and used to suppress voltages increases is no longer required. Interfering influences of the high-voltage transformer due to leakage to neighbouring assemblies such as, for example, the video amplifier are also significantly reduced.

Four partial windings are preferably tuned to four different harmonics, in particular to the 7th, the 8.5th, the 9.5th and 11th harmonic of the frequency of the flyback oscillation. This tuning produces a flyback pulse having a particularly favourable profile.

The partial windings of the high-voltage winding are preferably situated in chambers of a chamber-type coil former. The tuning to the harmonic desired in each case can be achieved here by the distance of the base of the chamber from the core, by the distance between the chambers and/or by the extent to which the partial winding fills the chambers. A plurality of possible options for achieving the tuning desired in each case are afforded by the dimensioning of such a chamber-type coil former. The distance between the first and second and between the next to last and last chamber of the chamber-type coil former may be significantly smaller than the distance between the rest of the chambers. As a result of this reduced distance, the winding capacitance between the windings is reduced and, consequently tuning to a particularly low harmonic is facilitated. The significantly smaller distance between the chambers at the ends of the coil former is, for example, approximately 30–50% of the distance between the rest of the chambers.

There is preferably no diode between the first partial winding and the reference potential, in particular earth, and between the last partial winding and the high-voltage terminal, that is to say, in particular, the anode of the picture tube. The first partial winding and the last partial winding then generally have a significantly lower degree of coupling than the partial windings in the centre region of the chamber-type coil former, as a result of which the tuning to the harmonic desired in each case is facilitated.

BRIEF DESCRIPTION OF THE DRAWINGS

The invention is explained below with reference to the drawing, in which

FIG. 1 shows an equivalent circuit diagram of the high-voltage transformer with the connected components for producing the high voltage, FIG. 2 shows the flyback pulse at the high-voltage winding for a known transformer, FIG. 3 shows the flyback pulse of a high-voltage winding for a transformer which is dimensioned according to the invention.

DETAILED DESCRIPTION OF THE PREFERRED EMBODIMENT

Figure 4:
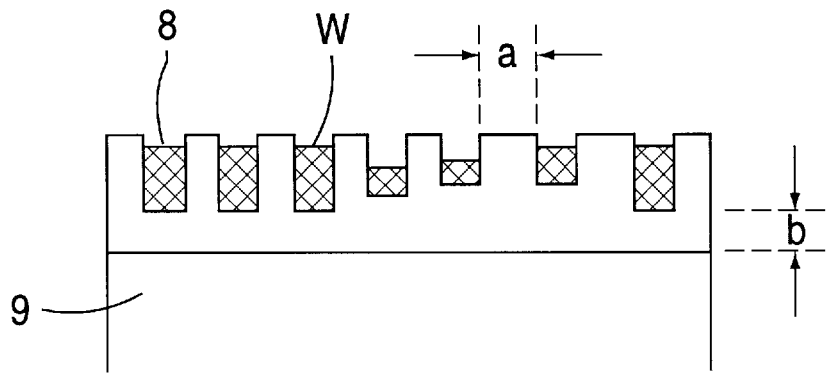
FIG. 4 shows a chamber-type coil former for the individual partial windings.

FIG. 1 shows the switching transistor 2, which is controlled by the line-frequency switching voltage 1, as well as the high-voltage transformer Tr with the primary winding W1 connected to the operating voltage UB and the partial windings W2, W3, W4, W5 forming the high-voltage winding. The high-voltage winding is constructed in accordance with the diode split principle, in that high-voltage rectifier diodes 3, 4, 5 are situated between the partial windings W2, W3, W4, W5. The secondary side thus begins in each case with a winding and ends with a winding. This means that there is no diode at all between the winding W2 and earth and between the winding W5 and the high-voltage connection. The number of partial windings W2–W5, i.e. four, is consequently greater than the number of diodes 3, 4, 5, i.e. three, situated between the partial windings. The high-voltage winding supplies the high voltage UH across the charging capacitor 6 which is essentially formed by the anode coating of the picture tube 7.

The partial winding W2 is tuned, for instance, to the 7th harmonic, the partial winding W3 to the 8.5th harmonic, the partial winding W4 to the 9.5th harmonic and the partial winding W5 to the 11th harmonic. As a result, the windings W3 and W4 together produce tuning to the 9th harmonic.

With a circuit of this type, a so-called RLC circuit in series with the primary winding W1 was hitherto required. The RLC circuit is a coil which is situated in the current path and is connected in parallel with the series circuit formed by a capacitor and a resistor. This circuit is used to reduce the internal resistance and to attenuate interfering voltage spikes at the collector of the transistor 2. The tuning which has been described means, however, that this circuit is no longer required.

The advantageous effect on the pulse waveform of the flyback pulse at the secondary winding is explained with reference to FIGS. 2 and 3.

FIG. 2 shows the flyback pulse at the windings W2–W5. It is evident that the pulse has a relatively small amplitude and width as well as an undesired valley 12 at the pulse peak. The valley 12 can lead to an interruption of the charging current for the charging capacitor and thereby increase the internal resistance. A further disadvantage is that the tuning to one harmonic causes an overshoot S at the frequency of the harmonic to occur at the end of the actual pulse. This overshoot causes, on the primary side, a voltage increase of the pulse at the transistor 2, which voltage increase can endanger the transistor 2.

FIG. 3 shows the flyback pulse at the high-voltage winding given the tuning which has been described. The pulse according to FIG. 3 has several advantages over the pulse according to FIG. 2. Firstly, the amplitude of the flyback pulse, which amplitude is critical for the magnitude of the high voltage which can be attained, is greater. In addition, the undesired valley 12' at the pulse peak is significantly smaller, which is advantageous for the internal resistance. Furthermore, the pulse peak is wider, with the result that the charging time for the charging capacitor is increased and the internal resistance is thus reduced. A further advantage is that a high overshoot at a singular frequency such as that shown in FIG. 2 does not take place at the end of the pulse, but rather interferences between the different frequencies which are effective in the tuning result in the occurrence only of an overshoot of reduced amplitude and reduced duration.

FIG. 4 shows the principle of a chamber-type coil former 9. The partial windings W of the high-voltage winding are situated in chambers 8 of the chamber-type coil former 9. The tuning to a specific harmonic desired in each case can be achieved by different structural parameters of the chamber-type coil former 9. That is to say, in particular, the different degrees shown to which a partial winding W fills the chambers 8, the varying distance a between the chambers as a result of a varying thickness of the chamber walls and a varying thickness b of the base of the groove, that is to say of the distance of the respective partial winding W from the core which carries the coil former 9. For example, increasing the distance b reduces the coupling level for achieving a specific tuning.

Figure 5:
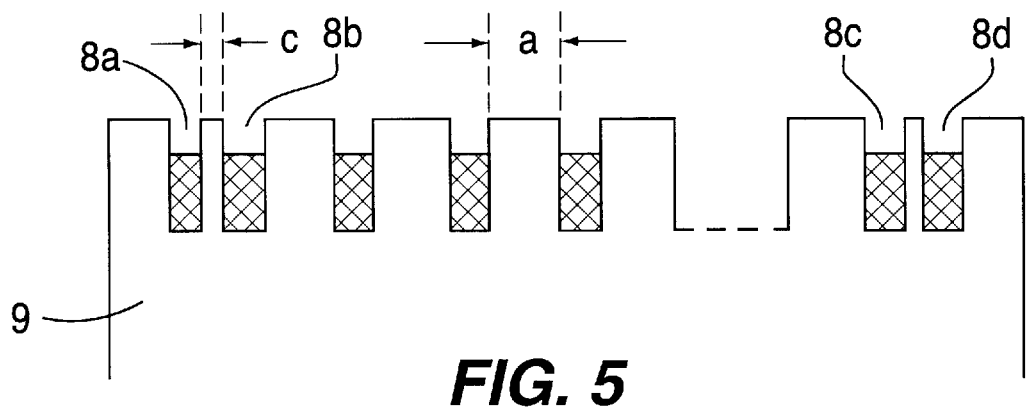
FIG. 5 shows a special design of the chamber-type coil former.

FIG. 5 shows a further design of the chamber-type coil former 9. The distance c between the first chamber 8a and the second chamber 8b and the distance between the next to last chamber 8c and the last chamber 8d are significantly smaller than the distance a between the chambers in the centre region of the chamber-type coil former 9. It is possible to achieve the respectively desired tuning to a desired harmonic by means of a structure of this type. The greater coupling capacitance, in particular, between the chambers 8a and 8b and the chambers 8c and 8d as a result of the reduced distance c permits tuning to particularly low harmonics. The distance c is approximately 30%–50% of the distance a.

Figure 6:
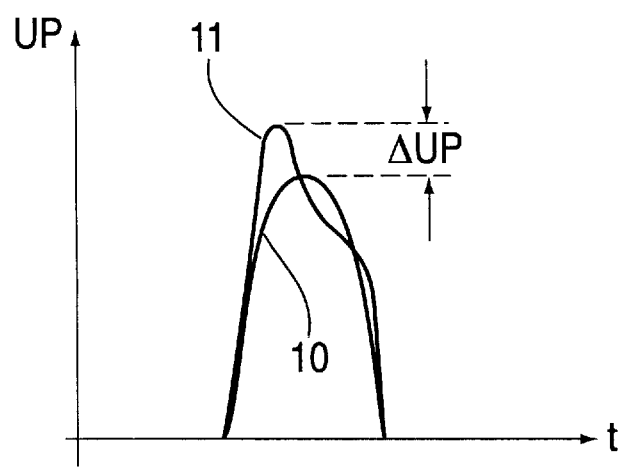
FIG. 6 shows the pulse waveform at the primary winding or at the switching transistor.

FIG. 6 shows the flyback pulse UP at the primary winding W1, that is to say at the collector of the transistor 2. The curve 10 applies when the beam current=0 and the curve 11 applies when the beam current=1.5 mA. Without the tuning which has been described, the illustrated voltage increase Δ up of 150 V may occur, which can endanger the transistor 2. This voltage increase was previously suppressed by means of the RLC circuit. As a result of the tuning which has been described, with the pulse waveform according to FIG. 3, this voltage increase Δ UP is significantly reduced, with the result that it is possible to dispense with the said RLC circuit.

I claim:

1. A high voltage transformer for a television receiver comprising a primary winding, a high voltage winding including a plurality of partial windings and a plurality of diodes, each of said plurality of diodes being positioned between a respective pair of adjacent partial windings, each of said partial windings being tuned to a specific harmonic of the frequency of the flyback oscillation, said partial windings being situated in chambers of a chamber-type coil former, wherein a distance between a first and second chamber and a distance between a next to last and last chamber of the coil former are significantly smaller than a distance between remaining chambers of the coil former, the number of said partial windings is greater than the number of diodes, and each of said partial windings are tuned to different harmonics.

2. Transformer according to claim 1, characterized in that four partial windings (W2–W5) are tuned to four different harmonics.

3. Transformer according to claim 2, characterized in that the partial windings (W2–W5) are tuned to the 7th, the 8.5th, the 9.5th and the 11th harmonic.

4. Transformer according to claim 1, characterized in that the tuning to the harmonic desired in each case is achieved by the distance (b) of the base of the chamber from the core, by the distance (a) between the chambers (8) and/or by the extent to which the partial winding (W) fills the chambers (8).

5. Transformer according to claim 1, characterized in that said distance between said first and second chambers and said distance between said next to last and last chambers are both within a range of substantially 30-substantially 50% less than the distance between the remaining chambers.

6. Transformer according to claim 1, characterized in that there is no diode in each case between the first partial winding (W2) and the reference potential and between the last partial winding (W5) and the high-voltage terminal.

* * * * *